US008879992B2

(12) United States Patent
Kneckt et al.

(10) Patent No.: US 8,879,992 B2
(45) Date of Patent: Nov. 4, 2014

(54) METHOD, APPARATUS, AND COMPUTER PROGRAM PRODUCT FOR DISCOVERY OF WIRELESS NETWORKS

(75) Inventors: Jarkko Kneckt, Espoo (FI); Eng Hwee Ong, Espoo (FI); Mika Kasslin, Espoo (FI); Gabor Bajko, Sunnyvale, CA (US)

(73) Assignee: Nokia Corporation, Espoo (FI)

( * ) Notice: Subject to any disclaimer, the term of this patent is extended or adjusted under 35 U.S.C. 154(b) by 266 days.

(21) Appl. No.: 13/282,696

(22) Filed: Oct. 27, 2011

(65) Prior Publication Data

US 2013/0109313 A1     May 2, 2013

(51) Int. Cl.
*H04B 7/00*     (2006.01)
*H04W 8/00*     (2009.01)
*H04W 4/00*     (2009.01)
*H04W 84/18*     (2009.01)

(52) U.S. Cl.
CPC .............. *H04W 8/005* (2013.01); *H04W 4/008* (2013.01); *H04W 84/18* (2013.01)
USPC ........... 455/41.2; 455/436; 455/515; 370/436

(58) Field of Classification Search
CPC ............................. H04W 84/18; H04W 8/005
USPC .......................... 455/41.1–41.3, 343.1–343.6
See application file for complete search history.

(56) References Cited

U.S. PATENT DOCUMENTS 7,085,868 B2 *   8/2006   Layman ........................ 710/240
7,203,768 B2 *   4/2007   Olsen ............................ 709/249
2006/0215622 A1   9/2006   Abdel-Kader et al.
2007/0171910 A1   7/2007   Kumar
2008/0031210 A1 *   2/2008   Abhishek et al. ............. 370/338

(Continued)

FOREIGN PATENT DOCUMENTS

EP           2207388 A1      7/2010
WO    WO 2005018162      2/2005
WO    WO2011064617 A1   6/2011

OTHER PUBLICATIONS

Guido R Hiertz et al: "IEEE 802.11s: WLAN mesh standardization and high performance extensions", IEEE Network, IEEE Service Center, New York, NY, US, vol. 22, No. 3, May 1, 2008 pp. 12-19, XP011214668 ISSN: 0890-8044.

(Continued)

*Primary Examiner* — Fayyaz Alam
*Assistant Examiner* — Mohammed Rachedine
(74) *Attorney, Agent, or Firm* — Locke Lord LLP

(57) ABSTRACT

Method, apparatus, and computer program product embodiments of the invention are disclosed to improve the discovery of wireless networks. In example embodiments of the invention, a method comprises: listening by an apparatus, to wireless discovery request messages transmitted by one or more wireless devices; listening by the apparatus, to wireless discovery response messages from one or more other wireless devices; and modifying transmission by the apparatus, of one or more of its own wireless discovery request messages based on at least one of the wireless discovery request messages listened to or the wireless discovery response messages listened to.

15 Claims, 7 Drawing Sheets

(56) References Cited

U.S. PATENT DOCUMENTS

| | | | |
|---|---|---|---|
| 2008/0096575 A1* | 4/2008 | Aragon et al. | 455/453 |
| 2008/0172491 A1* | 7/2008 | Chhabra et al. | 709/227 |
| 2009/0109850 A1* | 4/2009 | Li et al. | 370/235 |
| 2009/0190553 A1* | 7/2009 | Masuda et al. | 370/331 |
| 2009/0207758 A1 | 8/2009 | Jeong et al. | |
| 2010/0026265 A1 | 2/2010 | Kuno et al. | |
| 2010/0113042 A1 | 5/2010 | Kasslin et al. | |
| 2010/0165875 A1 | 7/2010 | Kneckt et al. | |
| 2010/0262651 A1* | 10/2010 | Nguyen et al. | 709/203 |
| 2010/0332822 A1 | 12/2010 | Liu et al. | |
| 2011/0141965 A1 | 6/2011 | Kasslin et al. | |
| 2012/0017267 A1 | 1/2012 | McCann et al. | |
| 2012/0178488 A1 | 7/2012 | Jonker et al. | |
| 2012/0185541 A1 | 7/2012 | Varvello et al. | |
| 2013/0036231 A1* | 2/2013 | Suumaki | 709/228 |
| 2013/0072248 A1* | 3/2013 | Bajko | 455/515 |

OTHER PUBLICATIONS

Extended European Search Report dated Feb. 7, 2013 for Application No. EP 12184175.3-2414.
U.S. Appl. No. 13/275,813, filed Oct. 18, 2011, Kneckt et al.
U.S. Appl. No. 13/282,703, filed Oct. 27, 2011, Kneckt et al.
International Search Report for International Application No. PCT/FI2012/050793 mailed Nov. 9, 2012.
Minghui Shi, et al. "IEEE802.11 Roaming and Authentication in Wireless LAN/Cellular Mobile Networks"; IEEE Wireless Communications • Aug. 2004, pp. 66-75.
Elias C. Efstathiou, et al. "A Peer-to-Peer Approach to Wireless LAN Roaming"; In Proceedings of the First ACM International Workshop on Wireless Mobile Applications and Services on WLAN Hotspots, pp. 10-18, San Diego, CA, 2003.
M. Buddhikot, et al. "Integration of 802.11 and Third-Generation Wireless Data Networks"; IEEE Infocom 2003, 10 pp.

* cited by examiner

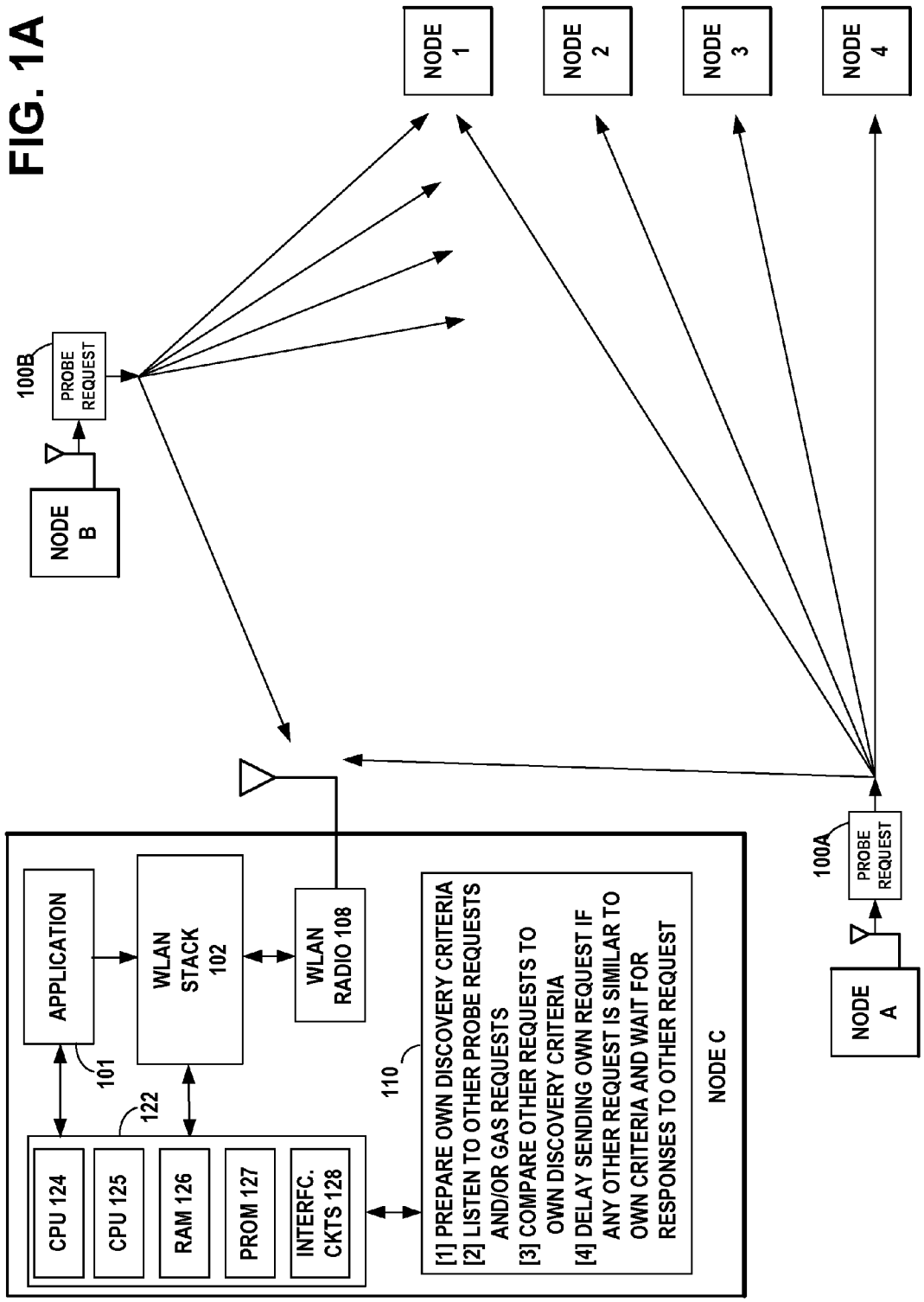

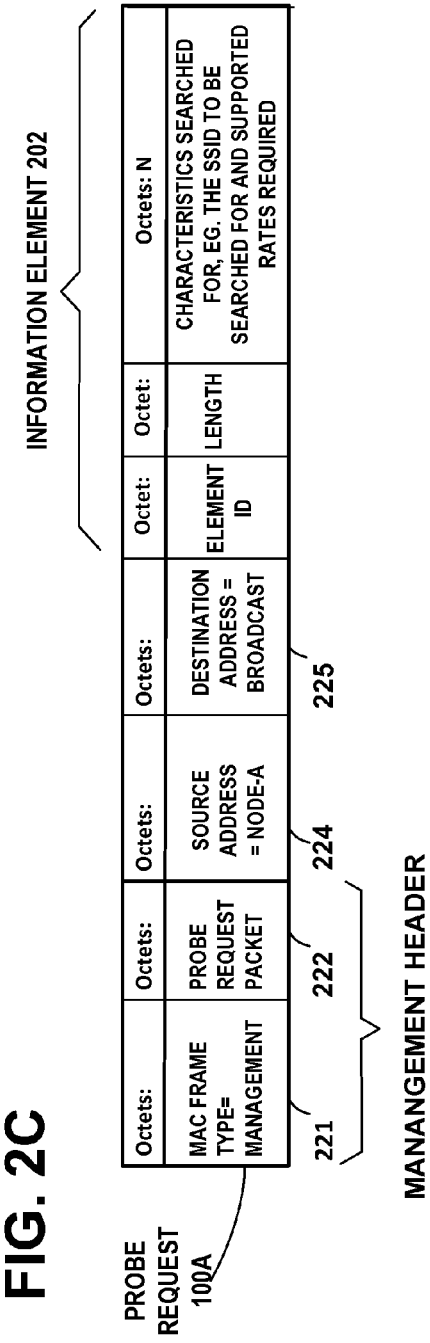
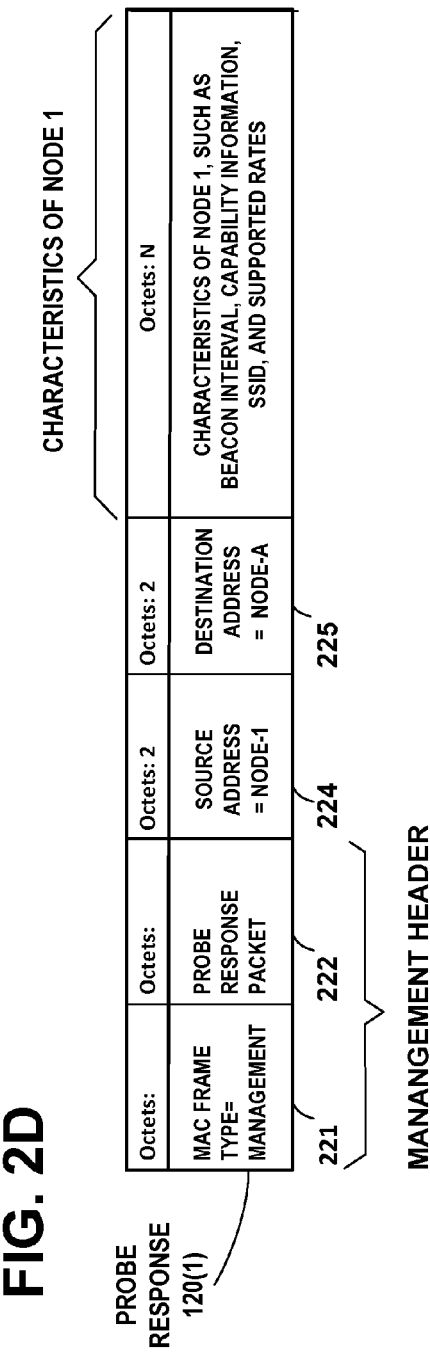

METHOD, APPARATUS, AND COMPUTER PROGRAM PRODUCT FOR DISCOVERY OF WIRELESS NETWORKS

FIELD

The embodiments relate to wireless communication, and more particularly to discovery of wireless networks.

BACKGROUND

Modern society has adopted, and is becoming reliant upon, wireless communication devices for various purposes, such as connecting users of the wireless communication devices with other users. Wireless communication devices can vary from battery powered handheld devices to stationary household and/or commercial devices utilizing an electrical network as a power source. Due to rapid development of the wireless communication devices, a number of areas capable of enabling entirely new types of communication applications have emerged.

Cellular networks facilitate communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHZ/1.8 GHZ bands in Europe and at 850 MHz and 1.9 GHZ in the United States. While long-range communication networks, like GSM, are a well-accepted means for transmitting and receiving data, due to cost, traffic and legislative concerns, these networks may not be appropriate for all data applications.

Short-range communication technologies provide communication solutions that avoid some of the problems seen in large cellular networks. Bluetooth™ is an example of a short-range wireless technology quickly gaining acceptance in the marketplace. In addition to Bluetooth™ other popular short-range communication technologies include Bluetooth™ Low Energy, IEEE 802.11 wireless local area network (WLAN), Wireless USB (WUSB), Ultra Wide-band (UWB), ZigBee (IEEE 802.15.4, IEEE 802.15.4a), and ultra-high frequency radio frequency identification (UHF RFID) technologies. All of these wireless communication technologies have features and advantages that make them appropriate for various applications.

SUMMARY

Method, apparatus, and computer program product embodiments of the invention are disclosed to improve the discovery of wireless networks.

In example embodiments of the invention, a method comprises:

listening by an apparatus, to wireless discovery request messages transmitted by one or more wireless devices;

listening by the apparatus, to wireless discovery response messages from one or more other wireless devices; and modifying transmission by the apparatus, of one or more of its own wireless discovery request messages based on at least one of the wireless discovery request messages listened to or the wireless discovery response messages listened to.

In example embodiments of the invention, the method further comprises:

comparing by the apparatus, characteristics of at least one of the wireless discovery request messages listened to, with one or more discovery criteria; and determining by the apparatus, whether to transmit one or more of its own wireless discovery request messages based on the comparison.

In example embodiments of the invention, the method further comprises:

comparing by the apparatus, characteristics of at least one of the wireless discovery responses listened to, with one or more discovery criteria, wherein at least one or more of the wireless discovery responses is not addressed to the apparatus, and determining by the apparatus, whether to transmit one or more of its own wireless discovery request messages based on the comparison.

In example embodiments of the invention, the method further comprises:

delaying or aborting transmission by the apparatus, of one or more of its own wireless discovery request messages based on at least one of the wireless discovery request messages listened to or the wireless discovery responses listened to.

In example embodiments of the invention, the method further comprises:

wherein at least one of the wireless discovery responses is not addressed to the apparatus.

In example embodiments of the invention, the method further comprises:

wherein the wireless discovery request messages are probe requests and the wireless discovery responses are probe responses.

In example embodiments of the invention, the method further comprises:

wherein the wireless discovery request messages are wireless generic advertisement service requests and the wireless discovery responses are wireless generic advertisement service responses.

In example embodiments of the invention, the method further comprises:

wherein the apparatus is in a discovery state.

In example embodiments of the invention, the method further comprises:

wherein the apparatus is at least one of a wireless access point device, a mesh point device, a wireless group owner device, or a wireless station.

In example embodiments of the invention, the method further comprises:

wherein the one or more other devices are at least one of one or more wireless access point devices, one or more mesh point devices, one or more wireless group owner devices, or one or more wireless stations.

In example embodiments of the invention, an apparatus comprises:

at least one processor;

at least one memory including computer program code;

the at least one memory and the computer program code configured to, with the at least one processor, cause the apparatus at least to:

listen to wireless discovery request messages transmitted by one or more wireless devices;

listen to wireless discovery response messages from one or more other wireless devices; and modify transmission of one or more of its own wireless discovery request messages based on at least one of the wireless discovery request messages listened to or the wireless discovery response messages listened to.

In example embodiments of the invention, the apparatus further comprises:

the at least one memory and the computer program code configured to, with the at least one processor, cause the apparatus at least to:

compare characteristics of at least one of the wireless discovery request messages listened to, with one or more discovery criteria; and determine whether to transmit one or more of its own wireless discovery request messages based on the comparison.

In example embodiments of the invention, the apparatus further comprises:

the at least one memory and the computer program code configured to, with the at least one processor, cause the apparatus at least to:

compare characteristics of at least one of the wireless discovery responses listened to, with one or more discovery criteria, wherein at least one or more of the wireless discovery responses is not addressed to the apparatus, and determine whether to transmit one or more of its own wireless discovery request messages based on the comparison.

In example embodiments of the invention, the apparatus further comprises:

the at least one memory and the computer program code configured to, with the at least one processor, cause the apparatus at least to:

delay or abort transmission of one or more of its own wireless discovery request messages based on at least one of the wireless discovery request messages listened to or the wireless discovery responses listened to.

In example embodiments of the invention, the apparatus further comprises:

wherein at least one of the wireless discovery responses is not addressed to the apparatus.

In example embodiments of the invention, the apparatus further comprises:

wherein the wireless discovery request messages are probe requests and the wireless discovery responses are probe responses.

In example embodiments of the invention, the apparatus further comprises:

wherein the wireless discovery request messages are wireless generic advertisement service requests and the wireless discovery responses are wireless generic advertisement service responses.

In example embodiments of the invention, the apparatus further comprises:

wherein the apparatus is in a discovery state.

In example embodiments of the invention, the apparatus further comprises:

wherein the apparatus is at least one of a wireless access point device, a mesh point device, a wireless group owner device, or a wireless station.

In example embodiments of the invention, the apparatus further comprises:

wherein the one or more other devices are at least one of one or more wireless access point devices, one or more mesh point devices, one or more wireless group owner devices, or one or more wireless stations.

In example embodiments of the invention, a computer program product comprising computer executable program code recorded on a computer readable, non-transitory storage medium, the computer executable program code, when executed by a computer processor in an apparatus, comprises:

code for listening by the apparatus, to wireless discovery request messages transmitted by one or more wireless devices;

code for listening by the apparatus, to wireless discovery response messages from one or more other wireless devices; and code for modifying transmission by the apparatus, of one or more of its own wireless discovery request messages based on at least one of the wireless discovery request messages listened to or the wireless discovery response messages listened to.

In this manner, embodiments of the invention improve the discovery of wireless networks.

DESCRIPTION OF THE FIGURES

FIG. 1A illustrates an example wireless network diagram of a sending wireless node, NODE A, broadcasting a probe request to a plurality of four receiving wireless nodes NODE 1 to NODE 4 and two listening nodes, NODE B and NODE C, in accordance with example embodiments of the invention.

FIG. 2C illustrates an example of the probe request broadcast by the sending wireless node, NODE A, as a probe request frame, in accordance with an example embodiment of the invention.

FIG. 2D illustrates an example format of the probe response frame, in accordance with an example embodiment of the invention.

DISCUSSION OF EXAMPLE EMBODIMENTS OF THE INVENTION

Figure 1B:
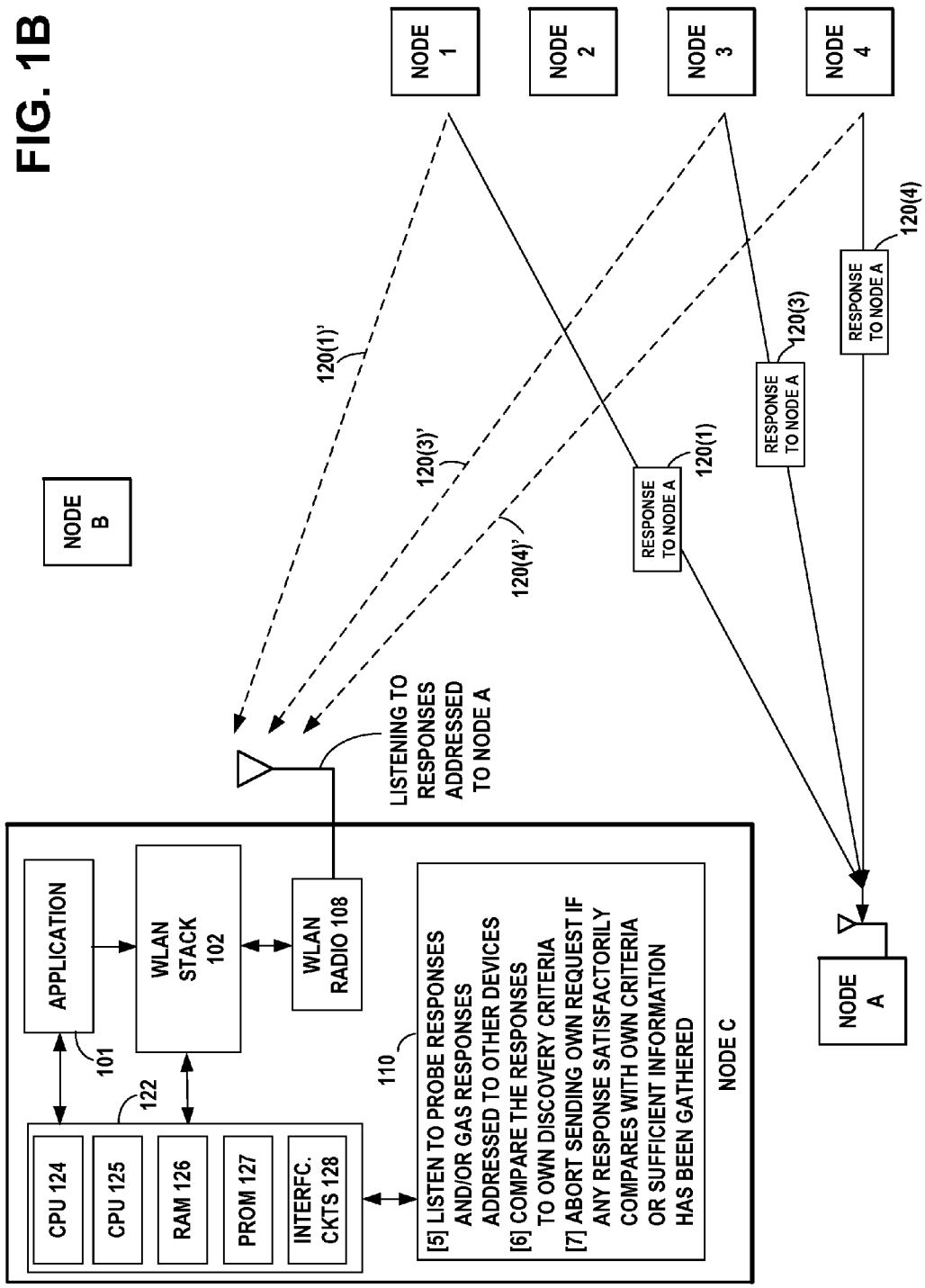
FIG. 1B illustrates the example wireless network diagram of FIG. 1A, of three receiving wireless nodes NODE 1, NODE 3, and NODE 4 of the plurality of four receiving wireless node devices, replying to the probe request with three respective probe responses addressed to NODE A, and NODE C listening to the three probe responses, in accordance with an example embodiment of the invention.

Many use cases for wireless networks may be improved by a faster initial link setup. For example, offloading traffic from a wide area network to a WLAN in an efficient way requires a fast initial link setup for the local area network. As another example, offloading traffic from a WLAN to a wireless personal area network (WPAN), such as a Bluetooth™ network, in an efficient way requires a fast initial link setup for the wireless personal area network.

Wireless discovery mechanisms include passive and active scanning. A device or station that uses the discovery mechanisms is said to be in the discovery state. In the passive scanning mode, a device or station in the discovery state listens to a channel for the scanning interval.

For example, a WLAN device in the discovery state, listens for beacon frames from any wireless networks or representatives of wireless networks or alternately, beacon frames that meet a given criterion, such as a device address or network ID. When a WLAN device in the discovery state uses the active scanning, it generates probe request frames and transmits them to request other devices to reply with probe response frames providing requested information.

As another example, a Bluetooth™ basic rate/enhanced data rate (BR/EDR) device in the discovery state may transmit inquiry request packets and then it may listen for inquiry response packets from a Bluetooth™ BR/EDR responding device containing the responding device's address, clock, and class of the device. The inquiry response packet may be followed by an extended inquiry response (EIR) packet that may be used to provide additional information during the inquiry response procedure, for example a local name and a list of supported services.

As another example, a Bluetooth™ Low Energy (LE) device in the discovery state is said to be in the Scanning State, wherein it listens for advertising channel packets from a specific device. The device in the discovery state may send a scanning request packet to an intended receiving device. The receiving device in the Advertising State, may respond with a scanning response packet that includes advertising data and the advertising responder's device address.

When a device in the discovery state uses the active scanning, it generates request frames and transmits them to request other devices to reply with response frames providing requested information.

It may be beneficial for devices in the discovery state to reduce the level of traffic contributed by their discovery operations. In example embodiments of the invention, a device in the discovery state may prepare its own discovery criteria for active scanning and/or discovery and then it may passively listen to other discovery requests transmitted by other devices conducting their own discovery operations. The passively listening device may then compare the other requests it listens to, with its own discovery criteria. Based on the comparison, the passively listening device may delay sending its own discovery request if any of the other requests it listens to, is similar to its own criteria for discovery, and it may then wait to listen for discovery responses that may be addressed to the other requesting devices. The passively listening device may compare the discovery responses to its own discovery criteria. The passively listening device may abort sending its own discovery request if any response it listens to satisfactorily compares with the passively listening device's own criteria or if sufficient discovery information has been gathered about the responding devices. In this manner, the passively listening device may improve its discovery performance and minimize unnecessary control frame traffic due to devices in the discovery state (i.e. discovering devices).

In accordance with example embodiments of the invention, unnecessary discovery requests are eliminated, resulting in higher speed discovery and scanning, improved device discovery time, reduced network load, and a reduction in power consumption of the discovering device. Consequently one also eliminates unnecessary responses by aborting sending one's own requests.

Example communication technologies that may benefit from example embodiments of the invention, are organized into the following topics:
  A. Bluetooth™ Communication Technology
  B. WLAN Communication Technology
    1. IEEE 802.11 MAC Frames and Information Elements
    2. IEEE 802.11 Beacon, Probe Request and Response
    3. Generic Advertisement Service (GAS)
    4. Wi-Fi Direct
    5. IEEE 802.11 Mesh Networks
  C. Expedited Scanning for Wireless Networks
  A. Bluetooth™ Communication Technology An example of a wireless short-range communication technology is Bluetooth™ communication protocol, which operates in the 2.4 GHz ISM band. Bluetooth™ is a short-range radio network, originally intended as a cable replacement. Bluetooth™ Technical Specifications are published by the Bluetooth™ SIG, Inc. On Jun. 30, 2010, the Bluetooth™ SIG published the Bluetooth™ Core Specification, Version 4.0, which includes the basic rate/enhanced data rate (BR/EDR) and additionally, the Bluetooth low energy (LE) protocol. The Bluetooth™ BR/EDR includes the extended inquiry response (EIR). An extended inquiry response may be used to provide miscellaneous information during the inquiry response procedure. Data types may be defined for such things as local name and supported services, information that otherwise would have to be obtained by establishing a connection. A device that receives a local name and a list of supported services in an extended inquiry response does not have to connect to do a remote name request and a service discovery protocol (SDP) service search, thereby shortening the time to useful information.

A procedure for forming connections between Bluetooth™ BR/EDR devices is described in the Bluetooth™ Specification. The Bluetooth™ Baseband is the part of the Bluetooth™ system that implements the media access control (MAC) and physical layer procedures to support the connection formation, exchange of data information streams, and ad hoc networking between Bluetooth™ devices. Connection formation includes inquiry, inquiry scanning, inquiry response, extended inquiry response, paging, page scanning, and page response procedures.

1. Bluetooth™ BR/EDR Inquiry Request

Inquiry is a procedure where a Bluetooth™ BR/EDR device transmits inquiry messages and listens for responses in order to discover the other Bluetooth™ devices that are within the coverage area. Bluetooth™ devices use the inquiry procedure to discover nearby devices, or to be discovered by devices in their locality. A Bluetooth™ device that tries to find other nearby devices is known as an inquiring device and actively sends inquiry requests. Bluetooth™ devices that are available to be found are known as discoverable devices, listen or scan for these inquiry requests and send responses. The inquiry procedure uses dedicated physical channels for the inquiry requests and responses. The inquiry procedure does not make use of any of the architectural layers above the physical channel, although a transient physical link may be considered to be present during the exchange of inquiry and inquiry response information.

Inquiry scan is a procedure where a Bluetooth™ BR/EDR device listens for inquiry messages received on its inquiry scan physical channel. A device using one of its inquiry scan channels remains passive on that channel until it receives an inquiry message on this channel from another Bluetooth™ device. This is identified by the appropriate inquiry access code. The inquiry scanning device will then follow the inquiry response procedure to return a response to the inquiring device.

2. Bluetooth™ BR/EDR Inquiry Response

An inquiry response packet, which is a frequency hop synchronization (FHS) packet, is transmitted from the slave to the master after the slave has received an inquiry message. This packet contains information necessary for the inquiring master to page the slave and follows 625 microseconds after the receipt of the inquiry message. The inquiry response packet is received by the master at the hop frequency of the inquiry message received by the slave was first in the master-to-slave slot. The slave response substate for inquiries differs completely from the slave response substate applied for pages. When the inquiry message is received in the inquiry scan substate, the recipient may return an inquiry response (FHS) packet containing the recipient's device address (BD_ADDR), clock, and class of device.

The clock $CLK_{27-2}$ in the FHS inquiry response packet is a 26-bit field that contains the value of the native clock CLKN of the device that sends the FHS packet, sampled at the beginning of the transmission of the access code of this FHS packet. This clock value has a resolution of 1.25 ms (two-slot interval). For each new transmission, this field is updated so that it accurately reflects the real-time clock value CLKN.

On the first inquiry message received in the inquiry scan substate the slave may enter the inquiry response substate. If the slave has non-zero extended inquiry response data to send it may return an FHS packet to the master, with the extended inquiry response bit set to one, 625 microseconds (μs) after the inquiry message was received. It may then return an extended inquiry response packet 1250 microseconds after the start of the FHS packet. If the slave's extended inquiry response data is all zeroes the slave may only return an FHS packet with the extended inquiry response bit set to zero. In step 1, the master transmits an inquiry request packet using the inquiry access code (IAC). In step 2, the slave responds with the FHS packet containing the slave's Bluetooth™ device address, native clock CLKN and other slave information. This FHS packet is returned at times that tend to be random. The FHS packet is not acknowledged in the inquiry routine, but it is retransmitted at other times and frequencies as long as the master is probing with inquiry messages. If the slave has non-zero extended inquiry response data, it sends an extended inquiry response packet to the master in step 3.

3. Bluetooth™ BR/EDR Extended Inquiry Response

An extended inquiry response may be used to provide miscellaneous information during the inquiry response procedure. Data types are defined for such things as local name and supported services, information that otherwise would have to be obtained by establishing a connection. A device that receives a local name and a list of supported services in an extended inquiry response does not have to connect to do a remote name request and a service discovery protocol (SDP) service search, thereby shortening the time to obtain useful information. If the slave transmits an extended inquiry response packet, it is transmitted 1250 microseconds after the start of the inquiry response packet. The extended inquiry response packet is received by the master at the hop frequency when the inquiry message was received by the slave in the master-to-slave slot. The extended inquiry response packet is an asynchronous connection-oriented logical transport (ACL) data medium rate (DM) packet with type DM1, DM3, DM5, DH1, DH3 or DH5. The packet is sent on the same frequency as the (frequency hop synchronization) FHS packet, 1250 microseconds after the start of the FHS packet.

The payload data has two parts, a significant part followed by a non-significant part. The significant part contains a sequence of data structures. The non-significant part contains all zero octets. The baseband may not change any octets in the significant part. When transmitting data, the non-significant part octets may be omitted from the payload. A device may store a single extended inquiry response packet. This packet may be used with all inquiry access codes (IACs).

4. Bluetooth™ Low Energy (LE)

On Jun. 30, 2010, the Bluetooth SIG published the Bluetooth Core Specification, Version 4.0, which includes the Bluetooth LE protocol for products that require lower power consumption, lower complexity, and lower cost than would be possible using the BR/EDR protocol. The Bluetooth LE radio operates in the unlicensed 2.4 GHz ISM band, in the same manner as does the Basic Rate/Enhanced Data Rate (BR/EDR) radio. Bluetooth LE is designed for applications requiring lower data rates and shorter duty cycles, with a very-low power idle mode, a simple device discovery, and short data packets. Bluetooth LE devices may employ a star topology, where one device serves as a master for a plurality of slave devices, the master dictating connection timing by establishing the start time of the first connection event and the slave devices transmitting packets only to the master upon receiving a packet from the master. According to Bluetooth LE communication protocol all connections are point-to-point connections between two devices (the master and the slave).

The Bluetooth LE protocol allows a star network topology in connections, where one device serves as a master for a plurality of slave devices. The master device dictates the connection timing and communication operations of the one or more slave devices. Bluetooth LE communicates over a total of 40 RF channels, each having a bandwidth of 2 MHz. Data communication between Bluetooth LE devices occurs in 37 pre-specified data channels, of the 40 RF channels. All data connection transmissions occur in connection events wherein a point-to-point connection is established between the master device and a slave device. In the Bluetooth LE protocol, a slave device provides data through Bluetooth LE communication to the master device to which it is connected. The remaining 3 channels, of the 40 RF channels, are advertising channels used by devices to advertise their existence and capabilities. The Bluetooth LE protocol defines a unidirectional connectionless broadcast mode on the advertising channels.

The Link Layer provides a state machine with the following five states: Standby State, Advertising State, Scanning State, Initiating State, and Connection State. The Link Layer state machine allows only one state to be active at a time. The Link Layer in the Standby State does not transmit or receive any packets and can be entered from any other state. The Link Layer in the Advertising State will be transmitting advertising channel packets and possibly listening to and responding to responses triggered by these advertising channel packets. A device in the Advertising State is known as an advertiser. The Advertising State can be entered from the Standby State. The Link Layer in the Scanning State will be listening for advertising channel packets from devices that are advertising. A device in the Scanning State is known as a scanner. The Scanning State can be entered from the Standby State. The Link Layer in the Initiating State will be listening for advertising channel packets from a specific device and responding to these packets to initiate a connection with that specific device. A device in the Initiating State is known as an initiator. The Initiating State can be entered from the Standby State. The Connection State of the Link Layer may be entered either from the Initiating State or the Advertising State. A device in the Connection State is known as being in a connection over a data channel. Within the Connection State, two roles are defined: the Master Role and the Slave Role. When a device in the Initiating State, enters the Connection State, it is in the Master Role, it exchanges data packets with a slave device in a data channel, and it defines the timings of transmissions. When a device in the Advertising State, enters the Connection State, it is in the Slave Role and exchanges data packets with a master device in a data channel, wherein the master device defines the timings of transmissions.

The advertising channel of the Bluetooth™ LE protocol may be used by a device in the discovery state (i.e., the Scanning State) to send a scanning request packet, SCAN_REQ, that includes the sender's device address and the address of the intended receiving device to which this scanning request packet is addressed. The receiving device in the Advertising State may respond on the advertising channel with a scanning response packet, SCAN_RSP, that includes advertising data and the advertising responder's device address.

B. WLAN Communication Technology

An example wireless network, such as a Wireless Local Area Network (WLAN) may be organized as an independent basic service set (IBSS), mesh basic service set (MBSS) or an infrastructure basic service set (BSS). Wireless devices in an independent basic service set (IBSS) communicate directly with one another and there is no access point (AP) in the IBSS. A mesh basic service set (MBSS) consists of autonomous wireless devices that establish peer-to-peer wireless links that provide means for multi-hop communication. An infrastructure basic service set (BSS) includes a wireless access point that may be connected to one or more servers and peripheral devices by a wired backbone connection. In an infrastructure BSS, the access point is a central hub to which mobile wireless devices are wirelessly connected. The mobile wireless devices typically do not communicate directly with one another, but communicate indirectly through the access point. An access point may be connected to other access points by a wired backbone connection in an extended service set (ESS). Mobile wireless devices may roam from one wireless connection with one access point to a second wireless connection with a second access point in the ESS, and still be linked to the first access point in the ESS via the wired backbone connection.

The IEEE 802.11 standard specifies methods and techniques of wireless local area network (WLAN) operation. Examples include the IEEE 802.11b and 802.11g wireless local area network specifications, which have been a staple technology for traditional WLAN applications in the 2.4 GHz ISM band. The various amendments to the IEEE 802.11 standard were consolidated for IEEE 802.11a, b, d, e, g, h, i, j protocols, into the base standard IEEE 802.11-2007, Wireless Medium Access Control (MAC) and Physical Layer (PHY) Specifications, June 2007 (incorporated herein by reference). Since then, emerging broadband applications have stimulated interest in developing very high-speed wireless networks for short range communication, for example, the IEEE 802.11n, the planned IEEE 802.11ac, and the planned IEEE 802.11 ad WLAN specifications that are to provide a very high throughput in higher frequency bands. Applications of these IEEE 802.11 standards include products such as consumer electronics, telephones, personal computers, and access points for both home and office.

According to an example embodiment, wireless local area networks (WLANs) typically operate in unlicensed bands. IEEE 802.11b and 802.11g WLANs have been a staple technology for traditional WLAN applications in the 2.4 GHz ISM band and have a nominal range of 100 meters. The IEEE 802.11ah WLAN standard is being developed for operation in the 900 MHz ISM band and will have a greater range and lower obstruction losses due to its longer wavelength.

1. IEEE 802.11 MAC Frames and Information Elements

There are three major types of medium access control (MAC) frames in the IEEE 802.11 protocol: the management frame, the control frame, and the data frame. Management frames provide management services. Data frames carry payload data. Control frames assist in the delivery of data frames. Each of these types of MAC frame consists of a MAC header, a frame body, and a frame check sequence (FCS). The header contains control information used for defining the type of 802.11 MAC frame and providing information necessary to process the MAC frame. The frame body contains the data or information included in either management type or data type frames. The frame check sequence is a value representing a cyclic redundancy check (CRC) over all the fields of the MAC header and the frame body field.

Management frames are used to provide management services that may be specified by variable-length fields called information elements included in the MAC frame body. An information element includes three fields: its function is identified by an element ID field, its size is provided by a length field, and the information to deliver to the recipient is provided in a variable-length information field.

2. IEEE 802.11 Beacon, Probe Request and Response a. Beacon

The beacon frame is a management frame that is transmitted periodically to allow wireless devices to locate and identify a network. The beacon frame includes the fields: timestamp, beacon interval, and capability information. The timestamp contains the value of the device's synchronization timer at the time that the frame was transmitted. The capability information field is a 16-bit field that identifies the capabilities of the device. The information elements in a beacon frame are the service set identifier (SSID), the supported rates, one or more physical parameter sets, an optional contention-free parameter set, and an optional traffic indication map.

i. Infrastructure BSS Networks with an Access Point

In an infrastructure BSS networks with an Access Point, beacon frames are used for enabling wireless devices to establish and maintain orderly communications. The beacon frames are transmitted by the Access Points at regular intervals and include a frame header and a body with various information, including a SSID identifying the name of a specific WLAN and a beacon interval specifying the intended time interval between two beacon transmissions. One purpose of the beacon frames is to inform the wireless devices about the presence of an Access Point in the area. The access point in an infrastructure BSS IEEE 802.11 WLAN network, may be a central hub that relays all communication between the mobile wireless devices (STAs) in an infrastructure BSS. If a STA in an infrastructure BSS wishes to communicate a frame of data to a second STA, the communication may take two hops. First, the originating STA may transfer the frame to the AP. Second, the AP may transfer the frame to the second STA. In an infrastructure BSS, the AP may transmit beacons or respond to probes received from STAs. After a possible authentication of a STA that may be conducted by the AP, an association may occur between the AP and a STA enabling data traffic to be exchanged with the AP. The Access Point in an Infrastructure BSS may bridge traffic out of the BSS onto a distribution network. STAs that are members of the BSS may exchange packets with the AP.

ii. Ad Hoc IBSS Networks

The first ad hoc wireless device to become active establishes an IBSS and starts sending beacons to inform the other wireless devices about the presence of an ad hoc network in the area. Other ad hoc wireless devices may join the network after receiving a beacon and accepting the IBSS parameters, such as the beacon interval, found in the beacon frame.

Each wireless device that joins the ad hoc network may send a beacon periodically if it doesn't hear a beacon from another device within a short random delay period after the beacon is supposed to be sent. If a wireless device doesn't hear a beacon within the random delay period, then the wireless device assumes that no other wireless devices are active in the ad hoc network and a beacon needs to be sent.

A beacon signal is periodically transmitted from the ad hoc network. The beacon frame is transmitted periodically and includes the address of the sending device.

b. Probe Request

The probe request frame is a management frame that is transmitted by a wireless device attempting to quickly locate a wireless local area network (LAN). It may be used to locate independent basic service sets (IBSSs), infrastructure basic service sets (BSSs) or mesh basic service sets (MBSSs) only or any of them. It may be used to locate a wireless LAN with a particular SSID or to locate any wireless LAN. The probe request frame may contain a service attribute request.

For active scans, the wireless device either broadcasts or unicasts a probe request on the channel it is scanning. It may set the SSID in the probe request to a wildcard SSID or to a specific SSID value. It may set the BSSID in the probe request a wildcard BSSID or to a specific BSSID value. With these options the wireless device can look for any SSID or BSSID, any representative of a specific SSID or a specific BSSID. The wireless device will add any received beacons or probe responses to a cached BSSID scan list. For passive scans, the wireless device does not send a probe request, but instead, listens on a channel for a period of time and adds any received beacons or probe responses to its cached BSSID scan list. The wireless device may scan both infrastructure and ad hoc networks, regardless of the current setting of its network mode. The wireless device may use either the active or passive scanning methods, or a combination of both scanning methods. The wireless device may perform the scan across all the frequency channels and bands that it supports.

i. Infrastructure BSS Networks with an Access Point

The wireless device may transmit a probe request and receive a probe response from the access point in the BSS. The probe request is transmitted by a wireless device to obtain information from another station or access point. For example, a wireless device may transmit a probe request to determine whether a certain access point is available. In the infrastructure BSS, only the AP responds to probe requests. The probe response sent back by the AP contains a timestamp, beacon interval, and capability information. It also includes the SSID of the BSS, supported rates, and PHY parameters. The wireless device STA may learn that the access point AP will accept the STA's credentials.

Exemplary rules applied by the scanning wireless device (i.e. scanner) and the APs with active scanning are as follows:

1) Scanner (for each channel to be scanned):
  a. Transmit a probe request frame (or multiple of thereof) with the SSID and the BSSID fields set as per the scan command;
  b. Reset ProbeTimer to zero and start it upon the probe request transmission;
  c. If nothing is detected (any signal with high enough energy) on the channel before the ProbeTimer reaches MinChannelTime (a.k.a. Min_Probe_Response_Time), then go to scan the next channel (if any), else when the ProbeTimer reaches MaxChannelTime (i.e., Max_Probe_Response_Time), process all received probe responses and go to scan the next channel (if any).

2) APs:
  a. An AP shall respond with a probe response only if:
    i. The Address 1 field in the probe request frame is the broadcast address or the specific MAC address of the AP; and
    ii. The SSID in the probe request is the wildcard SSID, the SSID in the probe request is the specific SSID of the AP, or the specific SSID of the AP is included in the SSID list element of the probe request, or the Address 3 field in the probe request is the wildcard BSSID or the BSSID of the AP.
  b. Some further conditions may be set as well for the generation of a probe response.

In general, the probe request transmitter specifies the conditions that wireless devices need to meet in order to respond to with a probe response. All wireless devices that fulfill the condition try to send a probe response frame. The active scanning mechanism defines the signaling.

ii. Ad Hoc IBSS Networks

The effect of receiving a probe request is to cause the wireless device to respond with a probe response if the conditions indicated in the probe request are met. When a wireless device arrives within the communication range of any member of an ad hoc network, its probe request frame inquiry signals are answered by a member of the ad hoc network detecting the inquiry. A device in an ad hoc network that broadcasted the latest beacon in the network responds to the probe request frame inquiry signals with a probe response containing the address of the responding device. The probe response frame also includes the timestamp, beacon interval, capability information, information elements of the SSID, supported rates, one or more physical parameter sets, the optional contention-free parameter set, and the optional ad hoc network parameter set.

Once a device has performed an inquiry that results in one or more ad hoc network descriptions, the device may choose to join one of the ad hoc networks. The joining process may be a purely local process that occurs entirely internal to the wireless device. There may be no indication to the outside world that a device has joined a particular ad hoc network. Joining an ad hoc network may require that all of the wireless device's MAC and physical parameters be synchronized with the desired ad hoc network. To do this, the device may update its timer with the value of the timer from the ad hoc network description, modified by adding the time elapsed since the description was acquired. This will synchronize the timer to the ad hoc network. The BSSID of the ad hoc network may be adopted, as well as the parameters in the capability information field. Once this process is complete, the wireless device has joined the ad hoc network and is ready to begin communicating with the devices in the ad hoc network.

c. Probe Response

The probe response sent back by a wireless device that met the conditions set by the received probe request contains a timestamp, beacon interval, and capability information. It also includes the SSID of the BSS, supported rates, and PHY parameters.

According to an example embodiment, standard spacing intervals are defined in the IEEE 802.11 specification, which delay a station's access to the medium, between the end of the last symbol of the previous frame and the beginning of the first symbol of the next frame. The short interframe space (SIFS), the shortest of the interframe spaces, may allow acknowledgement (ACK) frames and clear to send (CTS) frames to have access to the medium before others. The longer duration distributed coordination function (DCF) interframe space (IFS) or DCF Interframe Space (DIFS) interval may be used for transmitting data frames and management frames.

According to an example embodiment, after the channel has been released, IEEE 802.11 and before a probe response is transmitted, wireless devices normally employ a spectrum sensing capability during the SIFS interval or DIFS interval, to detect whether the channel is busy. A carrier sensing scheme may be used wherein a node wishing to transmit a probe response has to first listen to the channel for a predetermined amount of time to determine whether or not another node is transmitting on the channel within the wireless range. If the channel is sensed to be idle, then the node may be permitted to begin the transmission process. If the channel is sensed to be busy, then the node may delay its transmission of a probe response for a random period of time called the backoff interval. In the DCF protocol used in IEEE 802.11 networks, the stations, on sensing a channel idle for DIFS interval, may enter the backoff phase with a random value between 0 and a maximum value CWmin. The backoff counter may be decremented from this selected value as long as the channel is sensed idle for a predetermined time interval. After every received frame one may however wait for a DIFS before sensing the channel status and resuming backoff counter update.

3. Generic Advertisement Service (GAS)

IEEE 802.11u-2011 is an amendment to the IEEE 802.11-2007 base standard published as IEEE 802.11u-2011, Wireless LAN Medium Access Control (MAC) and Physical Layer (PHY) Specifications, Amendment 9: Interworking with External Networks, Feb. 25, 2011 (incorporated herein by reference). IEEE 802.11u-2011 adds features to improve interworking with external networks. IEEE 802.11u-2011 amendment establishes MAC and physical layer PHY protocols for an interworking service to permit a wireless device to exchange information with an external network, to enable the selection of networks to connect to, and to enable access to emergency services. A GAS is specified in the IEEE 802.11u amendment to enable mobile wireless devices or STAs to discover the availability of information related to desired network services. For example, the GAS enables discovery of information about services provided in an infrastructure basic service set, information about local access services, information from available Subscription Service Providers (SSP) and/or Subscription Service Provider Networks (SSPNs) or other external networks. GAS enables a wireless device to transmit a generic advertisement service initial request frame to request information about network services from access points and it enables an access point to use a generic container, a GAS initial response frame, to advertise information about network services over an IEEE 802.11 network. The GAS protocol has been proposed to be updated to operate with broadcast request and response messages. Public action frames are used to transport the GAS initial request frame and the GAS initial response frame.

4. Wi-Fi Direct

The Wi-Fi Alliance has developed a Wi-Fi Peer-to-Peer technology named Wi-Fi Direct™ that is specified in the Wi-Fi Alliance Peer-to-Peer Specification, October 2010 (incorporated herein by reference). Wi-Fi Direct is also referred to herein as Peer-to-Peer (P2P) or Device-to-Device (D2D). Wi-Fi Direct enables IEEE 802.11a, g, or n devices to connect to one another, peer-to-peer, without prior setup or the need for wireless access points. Devices that support Wi-Fi Direct may discover one another and advertise available services. Wi-Fi Direct devices support typical Wi-Fi ranges and the same data rates as can be achieved with an 802.11a, g, or n infrastructure connection. When a device enters the range of the Wi-Fi Direct device, it may connect to it using the specified protocol.

Wi-Fi Direct enables wireless devices that support Wi-Fi Direct, to connect to one another, point-to-point, without joining an infrastructure network. Wireless devices that support the specification will be able to discover one another and advertise available services. Wi-Fi Direct devices will support typical Wi-Fi ranges and the same data rates as can be achieved with an infrastructure connection. Wi-Fi Direct provides point-to-point connections for networks by embedding a software access point into any Wi-Fi Direct devices.

Wi-Fi Direct-certified devices may create direct connections between each other without requiring the presence of a traditional Wi-Fi infrastructure network of an access point or router. Wi-Fi Direct Device Discovery and Service Discovery features allow users to identify available devices and services before establishing a connection, for example, discovering which Wi-Fi Direct devices have a printer. Wi-Fi Direct devices may use Wi-Fi Protected Setup to create connections between devices.

A Wi-Fi Direct device is capable of a peer-to-peer connection and may support either an infrastructure network of an access point or router or a peer-to-peer connection. Wi-Fi Direct devices may join infrastructure networks as stations (STAs). Wi-Fi Direct devices may connect by forming groups in a one-to-one or one-to-many topology. The groups functions in a manner similar to an infrastructure basic service set. A single Wi-Fi Direct device will be the group owner that manages the group, including controlling which devices are allowed to join and when the group is started or terminated. The group owner is responsible for responding to probe requests in a similar manner as an AP of an infrastructure BSS. The group owner will appear as an access point to legacy client devices. A significant difference between a group owner and an access point is that it is optional for the group owner to route and forward traffic between clients associated to it.

Wi-Fi Direct devices include Wi-Fi Protected Setup Internal Registrar functionality. A Wi-Fi Direct device may be a group owner of a group and may be able to negotiate which device adopts this role when forming a group with another Wi-Fi Direct device. A group may include both Wi-Fi Direct devices and legacy devices (i.e., that are not compliant with the Wi-Fi Alliance Peer-to-Peer Specification). Legacy devices may only function as clients within a group.

Wi-Fi Direct devices may support discovery mechanisms. Device discovery is used to identify other Wi-Fi Direct devices and establish a connection by using a scan similar to that used to discover infrastructure access points. If the target is not already part of a group, a new group may be formed. If the target is already part of a group, the searching Wi-Fi Direct device may attempt to join the existing group. Wi-Fi Protected Setup may be used to obtain credentials from the group owner and authenticate the searching Wi-Fi Direct device. Wi-Fi Direct devices may include service discovery that enables the advertisement of services supported by higher layer applications to other Wi-Fi Direct devices. Service discovery may be performed at any time (e.g. even before a connection is formed) with any other discovered Wi-Fi Direct device.

A Group may be created by a single Wi-Fi Direct device. When forming a connection between two Wi-Fi Direct devices, a group may be formed automatically and the devices may negotiate to determine which device is the group owner. The group owner may decide if this is a temporary (single instance) or persistent (multiple, recurring use) group. After a group is formed, a Wi-Fi Direct device may invite another Wi-Fi Direct device to join the group. The decision of whether or not to accept an invitation may be left to the invited Wi-Fi Direct device.

5. IEEE 802.11 Mesh Networks

IEEE 802.11s is an IEEE 802.11 amendment for mesh networking, defining how wireless devices may interconnect to create a WLAN mesh network. In IEEE 802.11s networks, a wireless distribution system (DS) to which an access point (AP) connects may be replaced by a mesh of interoperable wireless links or multi-hop paths. End stations may establish interoperable peer-to-peer wireless links with neighboring end stations and APs in an 802.11 wireless mesh network. Mesh stations or mesh points may support mesh services in interoperable formation and operation of a Mesh Basic Service Set (MBSS). A mesh basic service set (MBSS) is a basic service set (BSS) that forms a self-contained network of mesh points, and which may be used as a distribution system (DS).

Mesh points that are members in an 802.11 WLAN mesh network, broadcast probe requests to discover candidate neighbors and obtain information about neighbors based on information elements (IEs) in probe response frames and in beacons. A mesh point performs passive or active scans to discover neighbor mesh points. A discovered mesh point may be considered a candidate peer mesh point if:

1. A beacon or probe response frame is received from the discovered mesh point;

2. The received beacon or probe response frame contains a mesh ID that matches the mesh ID of the scanning mesh point's mesh profile; and 3. The received beacon or probe response frame contains an appropriate mesh configuration element.

All mesh point devices have the same capability and each mesh point is capable of forward traffic. Each mesh point transmits Beacons as per beacon interval determined by each mesh point individually. Mesh points authenticate each other and provide a means to establish and manage links and peerings between mesh points. Peering is a logical relationship between two neighboring mesh points. A mesh network operates on the medium access control (MAC)-level and may operate as a bridge. Data type frame transmissions occur in links that a mesh point establishes with neighbor mesh points. A link is a result of a peering in which two neighboring mesh points authenticate each other. Actual data delivery occurs across paths that are established on top of links. Paths are either single-hop or multi-hop paths depending on the number of links along the path. Any higher layer, e.g. the internet protocol (IP) layer for networking, considers a mesh as a single hop and does not need to be aware of mesh operations.

A logical peering: relationship is established from one mesh point to another mesh point with a mesh peering management protocol. Mesh points participate with other mesh points in mesh functionalities such as path selection and forwarding. Mesh points may propagate mesh frames over multiple hops and connectivity is provided to all member mesh points.

IEEE 802.11s networks are described in the IEEE P802.115™/Standard for Information Technology—Telecommunications and information exchange between systems—Local and metropolitan area networks—Specific requirements—Part 11: Wireless LAN Medium Access Control (MAC) and Physical Layer (PHY) specifications Amendment 10: Mesh Networking, dated September 2011, which is incorporated herein by reference.

C. Expedited Discovery for Wireless Networks

Wireless local area networks (WLANs) are an example environment that may be used in the following example embodiments of the invention. However, example embodiments of the invention are applicable to other environments as well.

Many use cases for wireless local area networks (WLANs) may be improved by a faster initial link setup. For example, offloading traffic from a wide area network to a WLAN in an efficient way requires a fast initial link setup for the local area network.

Example WLANs that may be available for offloading traffic from a wide area network include, for example, IEEE 802.11, Digital Enhanced Cordless Telecommunications (DECT), and HiperLAN networks.

WLAN discovery mechanisms include passive and active scanning. A device or station that uses the discovery mechanisms is said to be in discovery state. In the passive scanning mode, a device or station in the discovery state listens to a channel for no longer than an interval determined for the scan. In practice, the passively scanning device looks for beacon frames from any wireless networks or representatives of wireless networks or alternatively beacon frames that meet a given criterion, such as a device address or network ID. When a device in the discovery state uses the active scanning, it generates probe request frames and transmits them to request APs to reply with probe response frames providing requested information.

The Generic Advertisement Service is an active discovery mechanism wherein mobile wireless devices or STAs in the discovery state may discover the availability of information related to desired network services. Generic Advertisement Service enables a wireless device to transmit a Generic Advertisement Service initial request frame to request information about network services from devices representing the network (as an example, access points) and it enables the devices to use a generic container, a Generic Advertisement Service initial response frame, to advertise information about network services over an IEEE 802.11 network.

It may be beneficial for devices in the discovery state to reduce the level of traffic contributed by their discovery operations. In example embodiments of the invention, a device in the discovery state may prepare its own discovery criteria for active scanning and/or for GAS based discovery and then it may passively listen to other probe requests and/or GAS requests transmitted by other devices conducting their own discovery operations. The passively listening device may then compare the other requests it listens to, with its own discovery criteria. Based on the comparison, the passively listening device may delay sending its own probe request or GAS request if any of the other requests it listens to, is similar to its own criteria for discovery, and it may then wait to listen for probe responses and/or GAS responses that may be addressed to the other requesting devices. The passively listening device may compare the probe responses and/or GAS responses to its own discovery criteria. The passively listening device may abort sending its own probe request and/or GAS request if any response it listens to satisfactorily compares with the passively listening device's own criteria or if sufficient discovery information has been gathered about the responding devices. In this manner, the passively listening device may improve its discovery performance and minimize unnecessary control frame traffic due to devices in the discovery state (i.e. discovering devices).

In example embodiments, the request may be a generalized management, control, or data frame and the response may be a generalized management, control, or data frame containing information that may be useful for discovery, in accordance with an example embodiment of the invention. In general the request may be referred to as a discovery request and the response may be referred to as a discovery response. In example embodiments, the request may be an IEEE 802.11 probe request or a generic advertisement service initial request. In example embodiments, the response may be an IEEE 802.11 probe response or a generic advertisement service initial response. In example embodiments, one or more of the nodes may be a wireless station, a mesh point device, or may be generalized as a hub device representing either an access point device in an infrastructure network or a group owner device in a peer-to-peer network, in accordance with example embodiments of the invention.

In accordance with example embodiments of the invention, unnecessary requests are eliminated, resulting in higher speed discovery and scanning, improved device discovery time, reduced network load, and a reduction in power consumption of the discovering device. Consequently one also eliminates unnecessary responses by aborting sending one's own requests.

FIG. 1A illustrates an example wireless network diagram wherein two sending wireless nodes, NODE A and NODE B, may conduct active discovery by unicasting, groupcasting or broadcasting respective probe requests and/or GAS requests 100A and 100B to a plurality of four receiving wireless nodes, NODE 1 to NODE 4. FIG. 1A further shows a listening node in the discovery state, NODE C, that may have prepared its own discovery criteria for active discovery. However, NODE C may passively listen to the other requests 100A and 100B unicast, groupcast or broadcast by the other nodes, NODE A and NODE B, conducting their own active discovery operations, in accordance with an example embodiment of the invention.

FIG. 1A further shows the listening node in the discovery state, NODE C, may then compare the other requests 100A and 100B that it listens to, with its own discovery criteria. Based on the comparison, the listening node in the discovery state, NODE C, may delay sending its own probe request or GAS request if any of the other requests 100A and 100B that it listens to, is similar to its own criteria for discovery. Based on the comparison, the NODE C may then wait to listen for probe responses and/or GAS responses from any of the plurality of four receiving wireless nodes, NODE 1 to NODE 4, which may be addressed to the other requesting nodes, NODE A and NODE B, in accordance with an example embodiment of the invention.

FIG. 1B illustrates the example wireless network diagram of FIG. 1A, of three receiving wireless nodes NODE 1, NODE 3, and NODE 4 of the plurality of four receiving wireless node devices, replying to the probe request and/or GAS request 100A from NODE A, with three respective probe responses and/or GAS responses 120(1), 120(3), 120(4) addressed to NODE A. FIG. 1B further shows the listening node in the discovery state, NODE C, listening to the same three probe responses and/or GAS responses 120(1)', 120(3)', 120(4)' that were addressed to NODE A, in accordance with an example embodiment of the invention.

The listening node in the discovery state, NODE C, may compare the probe responses and/or GAS responses 120(1)', 120(3)', 120(4)' to its own discovery criteria. The listening node in the discovery state, NODE C, may abort sending its own probe request and/or GAS request if any response 120(1)', 120(3)', 120(4)' it listens to satisfactorily compares with the NODE C's own discovery criteria or if sufficient discovery information has been gathered about the responding nodes, NODE 1, NODE 3, and NODE 4. In this manner, the listening node in the discovery state, NODE C may improve its discovery performance and minimize unnecessary control frame traffic due to discovering devices.

In example embodiments, any of the several nodes, NODE A, NODE B, NODE C, and NODE 1 to NODE 4, may be generalized as a mobile or fixed station device, a mesh point device, or a hub device representing either an access point device in an infrastructure network or a group owner (GO) device in a peer-to-peer (P2P) network, in accordance with example embodiments of the invention. Any of the nodes may be a modern smartphone configured as an access point so that it may share its cellular telephone connection with other surrounding devices via a WLAN link. Examples of wireless devices embodying any of the several nodes, NODE A, NODE B, NODE C, and NODE 1 to NODE 4, may include mobile phones, smart phones, personal digital assistants, pagers, Bluetooth™ headsets, wireless microphones, wireless remote controls, wireless sensors, laptops, palmtops, tablet computers, appliances with an embedded wireless microcontroller, clothing with an embedded wireless micro-controller, automobile dashboards with an embedded wireless micro-controller, engine control computers with a wireless interface, video game consoles with a wireless interface, digital toys with a wireless interface, such as a wireless robot, and the like.

In accordance with an example embodiment of the invention, the listening node in the discovery state, NODE C, is shown in FIGS. 1A and 1B in functional block diagram form, which illustrates an example embodiment of the node's components. The listening node in the discovery state, NODE C, may include a processor 122, which includes a single core central processing unit (CPU) or multiple core CPU 124 and 125, a random access memory (RAM) 126, a programmable read only memory (PROM) 127, and interface circuits 128 to interface with one or more radio transceivers 108, battery or house power sources, keyboard, display, etc. The RAM and PROM may be removable memory devices such as smart cards, SIMs, WIMs, semiconductor memories such as RAM, ROM, PROMS, flash memory devices, etc.

In accordance with an example embodiment of the invention, an example WLAN protocol stack 102 may include the IEEE 802.11u protocol in the listening node in the discovery state, NODE C. The protocol stack 102 may be computer code instructions stored in the RAM and/or PROM memory of the processors 122, which when executed by the central processing units (CPU), carry out the functions of the example embodiments of the invention.

In accordance with an example embodiment of the invention, the buffer 110 of NODE C, which may be a partition of the RAM 126, is shown in FIG. 1A buffering instructions executable in the CPU to perform the following example sequential steps:

[1] PREPARE OWN DISCOVERY CRITERIA;
[2] LISTEN TO OTHER PROBE REQUESTS AND/OR GAS REQUESTS;
[3] COMPARE OTHER REQUESTS TO OWN DISCOVERY CRITERIA;
[4] DELAY SENDING OWN REQUEST IF ANY OTHER REQUEST IS SIMILAR TO OWN CRITERIA AND WAIT FOR RESPONSES TO OTHER REQUEST.

In accordance with an example embodiment of the invention, the buffer 110 of NODE C, is shown in FIG. 1B buffering instructions executable in the CPU to perform the following example sequential steps:

[5] LISTEN TO PROBE RESPONSES AND/OR GAS RESPONSES ADDRESSED TO OTHER DEVICES;

[6] COMPARE THE RESPONSES TO OWN DISCOVERY CRITERIA;

[7] ABORT SENDING OWN REQUEST IF ANY RESPONSE SATISFACTORILY COMPARES WITH OWN CRITERIA OR SUFFICIENT INFORMATION HAS BEEN GATHERED.

In accordance with an example embodiment of the invention, all possible frames are attempted to be examined during discovery. For example, the discovering device may avoid using receiver address filtering in the discovery phase, instead of filtering out all the frames that contain other than the broadcast address (all ones) or the device's own address in the receiver address field. In example embodiments of the invention, the discovering device uses all the frames, regardless of the receiver address field value. Further processing by the discovery device depends on the frame type and the MAC header field values as described in the following:

a) If the received frame is a probe response frame or a GAS response frame that was transmitted addressed to some other device, then in accordance with example embodiments of the invention, the discovering device uses the frame content as if it were transmitted to the device itself. Probe response frames or a GAS response frames typically contain information that is valuable for all the devices conducting discovery.

b) In example embodiments of the invention, if the received frame is a data type frame that indicates that it was sent from an AP (i.e., the frame has the "To DS" bit set to '0' and the "From DS" bit set to '1'), the frame may indicate that the discovering device is within range of an AP that operates as per the BSSID in the transmitter address field of the frame. If the discovering device is looking for that specific AP, this data type frame may be used to confirm that the discovering device is within communication range of that AP. In more general terms any frame transmitted in the "downstream" direction from a device representing a wireless network, to an end device may be used as an indication of a network within range of the discovering device. In case of infrastructure network, the network is represented by the APs and the downstream direction is indicated by the "To DS" and the "From DS" bits. In example embodiments of the invention, the signal quality estimate of the received frame, for example the received signal strength indicator (RSSI), may be used to assist in the selection of an AP with the maximum RSSI, given that the selected AP possesses other requirements of the discovering device.

In accordance with an example embodiment of the invention, discovery (probe or GAS) request transmissions may be delayed or discarded once the discovering device has detected discovery request frames from other devices that have similar discovery criteria.

In example embodiments of the invention, a discovering device uses received frames to control transmission of discovery request frames. Thus, there may be considered to be a control loop from a receiver side to the transmitter side with which the discovering device may delay or even entirely discard transmission of the discovering device's own probe or GAS request frame. This may be considered as a real time method to change from use of active scanning to passive scanning. Transmission delay may be implemented, for example, by deferring backoff counter decrement processing for a pre-determined time period or a sequence of the time periods.

In example embodiments of the invention, first, the discovering device uses all detected discovery request frames transmitted by other devices to decide whether the discovering device, itself, needs to transmit a discovery request frame or is it better to wait for responses to others' requests. Decision criteria may vary. The discovering device may require the detected discovery request frame to contain exactly the same response criteria for APs that the discovering device, itself, intends to use, in order to delay its own transmission. Alternatively, it may be enough to have only partial overlap in the response criteria to decide to postpone the discovering device's own transmission. It is also possible that the discovering device sets different weights for different response criteria if some response criteria matter more than others. Then if the discovering device detects a discovery request frame with the most important response criteria, the discovering device may postpone its own discovery request frame transmission. One approach is to use this method of postponing the discovering device's own discovery request transmissions only if the discovering device is looking for any devices/APs (wildcard SSID and BSSID). Then, any responses from any devices/APs may contain valuable information. The signal quality estimate of the detected discovery request frame, for example the RSSI, may be used, as well as additional information, to decide whether the discovering device should postpone its own transmission. The higher the estimate, the more probable it is that the discovering device receives the same responses as the device that transmitted the discovery request. Then, it is safer to postpone the discovering device's own discovery request transmission. The discovering device may have a signal quality estimation threshold that needs to be exceeded by a detected discovery request frame before the device considers the frame in the control of the discovering device's own discovery request transmissions. In accordance with the invention, the discovering device avoids postponing its own transmissions when it is unclear whether the discovering device is able to receive related responses at all, due to distance to the responder.

If the discovering device has delayed and postponed its own discovery request frame transmission and received all the needed or enough information before transmission, the discovering device may discard the whole transmission and close discovery in the channel. Decision criteria here may be exactly the same as when deciding whether to postpone discovery request frame transmission, as described above. In an example embodiment, the discovering device may discard its own transmission only if the discovering device has been looking for a specific device/AP and the discovering device has detected it thanks to responses to others' requests.

In example embodiments of the invention, it may be possible that there are no probe requests or GAS requests received by the listening node in the discovery state, NODE C, before it receives one or more of the probe responses or GAS responses 120(1)', 120(3)', 120(4)' addressed to NODE A. In this event, NODE C will modify one or more of its own wireless discovery request messages based on at least the one or more probe responses or GAS responses 120(1)', 120(3)', 120(4)' listened to, that were addressed to NODE A. The listening node in the discovery state, NODE C, may compare the probe responses and/or GAS responses 120(1)', 120(3)', 120(4)' to its own discovery criteria. The listening node in the discovery state, NODE C, may abort sending its own probe request and/or GAS request if any response 120(1)', 120(3)', 120(4)' it listens to satisfactorily compares with the NODE C's own discovery criteria or if sufficient discovery information has been gathered about the responding nodes, NODE 1, NODE 3, and NODE 4. In this manner, the listening node in the discovery state, NODE C may improve its discovery performance and minimize unnecessary control frame traffic due to discovering devices.

In example embodiments of the invention, listening node in the discovery state, NODE C, may have prepared its own discovery criteria for active discovery, to discover a wireless network matching one or more predetermined characteristics. A description of the one or more predetermined characteristics may be contained in NODE C for comparison with discovery data in a discovery response, such as the probe response 120(1)' of FIG. 1B, received from NODE 1 as a reply to a probe request 100A from NODE A. In example embodiments, the predetermined characteristics may simply be that there is another network. In example embodiments, the predetermined characteristics may be a device MAC address and/or a network SSID or BSSID. In example embodiments, the predetermined characteristics may be for an infrastructure BSS, with specified capability information, supported rates, PHY parameters, and/or authentication credentials. In example embodiments, the predetermined characteristics may be for an IBSS Ad Hoc Network with specified capability information, supported rates, one or more physical parameter sets, optional contention-free parameter set, and/or optional ad hoc network parameter set. In example embodiments, the predetermined characteristics may be for a mesh network with specified mesh ID and/or mesh configuration. In example embodiments, the predetermined characteristics may be for information about services provided in an infrastructure basic service set, information about local access services, information from available Subscription Service Providers (SSP) and/or Subscription Service Provider Networks (SSPNs) or other external networks, as provided in a GAS initial response frame advertising information about network services.

Figure 2A:
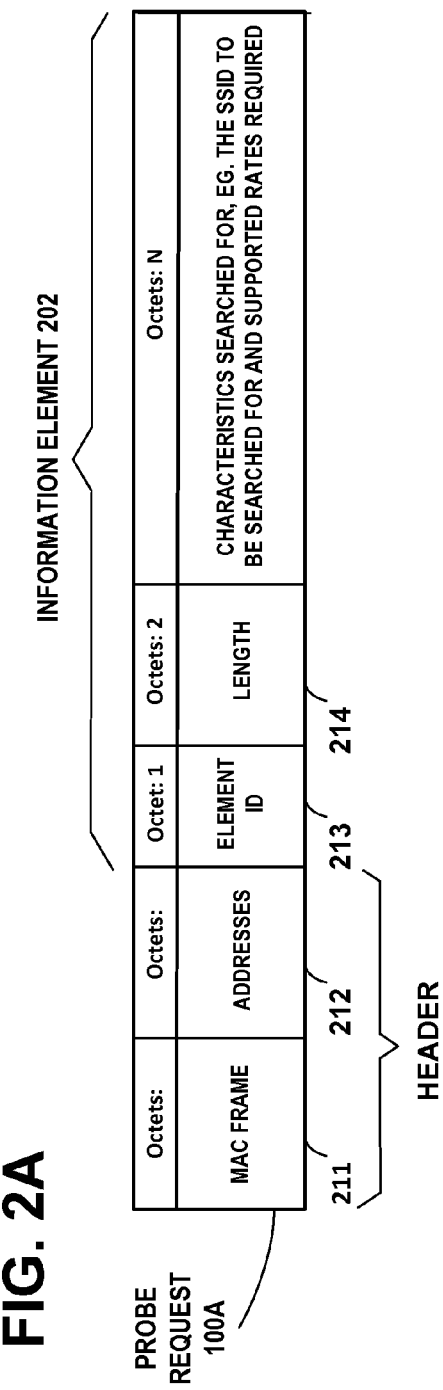
FIG. 2A illustrates an example of the probe request broadcast by the sending wireless node, NODE A, as a generalized message in the form of a frame body that includes an information element that contains the discovery criteria for which NODE A is searching, in accordance with an example embodiment of the invention.

FIG. 2A illustrates an example of the probe request 100A in the form of a generalized message transmitted by the sending wireless node, NODE A. The generalized message is in the form of a frame body that includes an information element 202, that contains the discovery characteristics for which NODE A is searching. In example embodiments, the probe request 100A may be a generalized management, control, or data frame, in accordance with an example embodiment of the invention. The probe request 100A includes a header with MAC frame control information field 211 and address fields 212 and the information element 202. The information element 202 may include the element ID field 213, the length field 214, and the information field that may contain, for example, the SSID to be searched for and Supported Rates required, in accordance with an example embodiment of the invention.

Figure 2B:
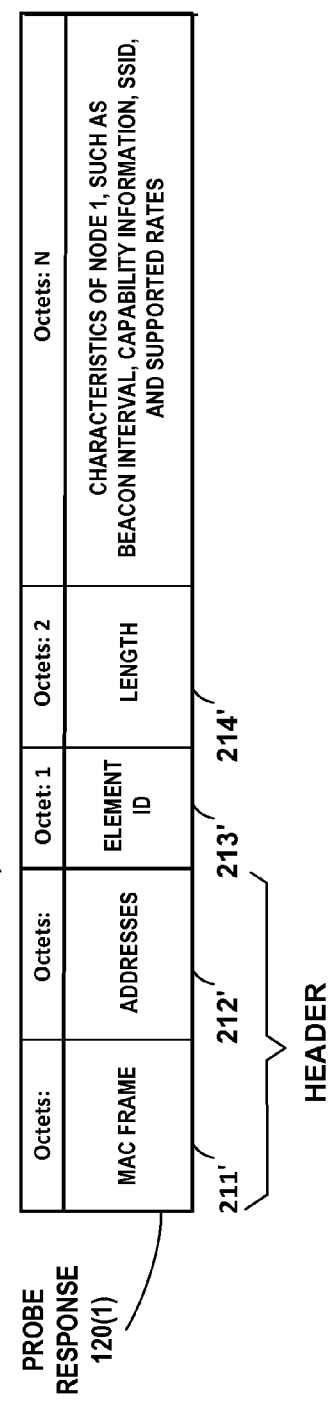
FIG. 2B illustrates an example of the probe response unicast by the wireless node, NODE 1, as a generalized message in the form of a frame body that includes an information element that contains the characteristics of NODE 1, in accordance with an example embodiment of the invention.

FIG. 2B illustrates an example of the probe response 120 (1) in the form of a generalized message unicast by the wireless node, NODE 1. The generalized message is in the form of a frame body that includes an information element 204, that contains the characteristics of NODE 1. In example embodiments, the probe response 120(1) may be a generalized management, control, or data frame, in accordance with an example embodiment of the invention. The probe response 120(1) includes a header with MAC frame control information field 211' and address fields 212' and the information element 204. The information element 204 may include the element ID field 213', the length field 214', and the information field that may contain, for example, the characteristics of node 1, such as beacon interval, capability information, SSID, and supported rates, in accordance with an example embodiment of the invention.

FIG. 2C illustrates an example of the probe request 100A broadcast by the sending wireless node, NODE A, as a probe request frame, in accordance with an example embodiment of the invention. Probe request frame 100A includes an IEEE 802.11 management header that includes MAC frame type 221 indicating it is a management frame. Field 222 identifies the frame 100A as a probe request packet. Field 224 is the source address for NODE A and field 225 is the broadcast address. The frame body portion of the probe request frame 100' includes the information element 202 that may include the element ID field, the length field, and the information field that may contain, for example, the SSID to be searched for and Supported Rates required, in accordance with an example embodiment of the invention.

FIG. 2D illustrates an example format of the probe response frame 120(1), in accordance with an example embodiment of the invention. FIG. 2D illustrates one example embodiment of a probe response frame 120(1) sent by the receiving wireless node, NODE 1 to the sending wireless node, NODE A. The probe response frame 120(1) includes an IEEE 802.11 management header that includes MAC frame type 221 indicating it is a management frame. Field 222 identifies the frame 120(1) as a probe response packet. Field 224 is the source address for NODE 1 and field 225 is the destination address NODE A. The frame body portion of the response frame 120(1) includes receiving wireless node, NODE 1 response data, for example, the characteristics of NODE 1, such as beacon interval, capability information, SSID, and supported rates, in accordance with an example embodiment of the invention. In example embodiments, the receiving wireless node device NODE 1 may be generalized as a mobile or fixed station device, a mesh point device, or a hub device representing either an access point device in an infrastructure network or a group owner device in a peer-to-peer network, in accordance with example embodiments of the invention.

Figure 3A:
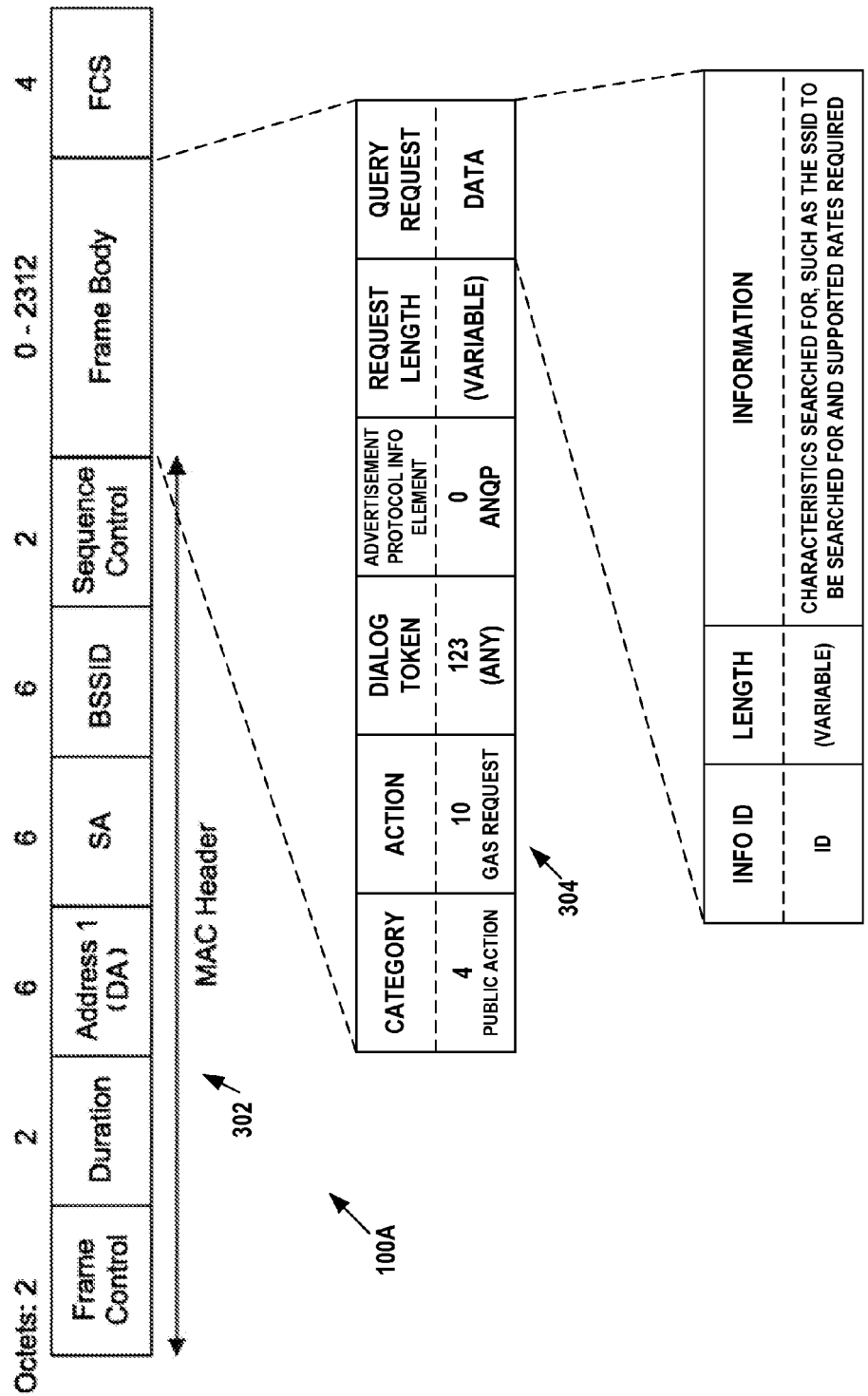
FIG. 3A illustrates an example of the wireless message as a Generic Advertisement Service Initial Request Frame, in accordance with an example embodiment of the invention.

FIG. 3A illustrates an example format of the Generic Advertisement Service Initial Request Frame 100A, in accordance with an example embodiment of the invention. The IEEE 802.11 MAC management frame 302 shown in FIG. 3A may have the frame control field indicate that this is a management frame, the frame type and subtype fields are set to indicate an action frame. The frame body 304 category field that may indicate a public action frame to allow communications between an access point and an unassociated STA. An action field value of 10 may indicate a GAS Initial Request, transmitted by a requesting STA to request information from another STA. The GAS protocol has been proposed to be updated to operate with broadcast request messages.

In accordance with an example embodiment of the invention, as shown in FIG. 3A, when the public action field is set to value of 10 to indicate GAS initial request 100A, access network query protocol (ANQP) information elements may be sent with query request data. In accordance with an example embodiment of the invention, the query request data may include, for example, the SSID to be searched for and Supported Rates required, in accordance with an example embodiment of the invention. The dialog token field may be set by the requesting station with any value, such as "123", to identify the GAS initial request frame. The GAS initial request frame 100' may include a length value for the length of the following query request field.

Figure 3B:
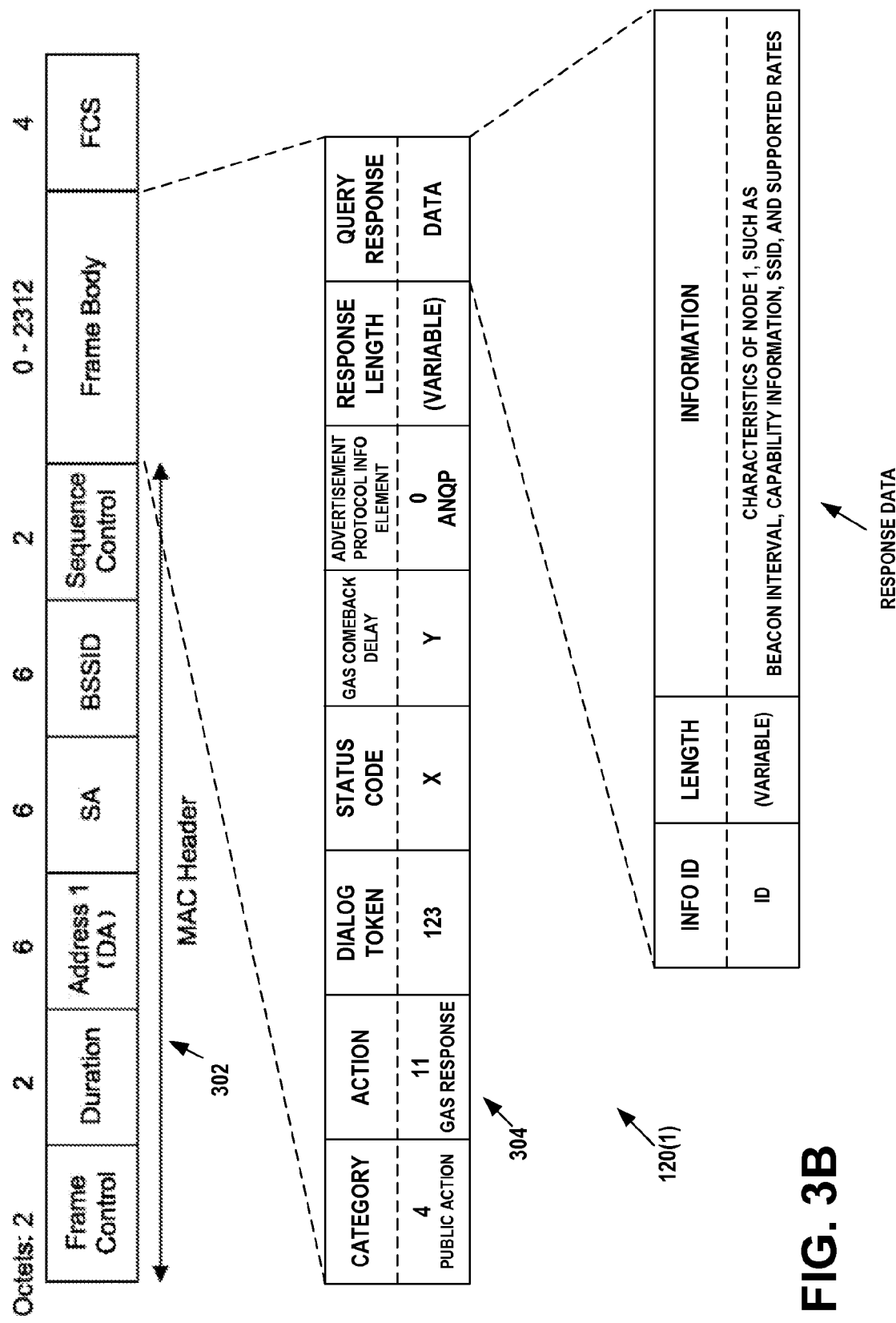
FIG. 3B illustrates an example frame body format of the Generic Advertisement Service Initial Response Frame, in accordance with an example embodiment of the invention.

FIG. 3B illustrates an example format of the Generic Advertisement Service Initial Response Frame 120(1), transmitted by the receiving wireless node device NODE 1 to the sending wireless node, NODE A, in accordance with an example embodiment of the invention. The Generic Advertisement Service initial response frame 120(1) shown in FIG. 3B, may include a category field that is set to a value of 4 indicating a public action frame. The GAS initial response frame 120(1) shown in FIG. 3B, may be sent to a unicast address, such as to sending wireless node, NODE A. The GAS initial response frame 120(1) shown in FIG. 3B, may include a dialog token field which is set to a value, such as "123", identical to the corresponding value in the GAS initial request frame 100A, to enable relating the response frame to the request frame. The GAS initial response frame 120(1) shown in FIG. 3B, may include a comeback delay value field.

In accordance with an example embodiment of the invention, the Generic Advertisement Service Initial Response Frame 120(1) may have ANQP information elements sent in the query response field for the receiving wireless node device NODE 1 response data, for example, the characteristics of NODE 1, such as beacon interval, capability information, SSID, and supported rates, in accordance with an example embodiment of the invention. In example embodiments, the receiving wireless node device NODE 1 may be generalized as a mobile or fixed station device, a mesh point device, or a hub device representing either an access point device in an infrastructure network or a group owner device in a peer-to-peer network, in accordance with example embodiments of the invention.

Figure 4:
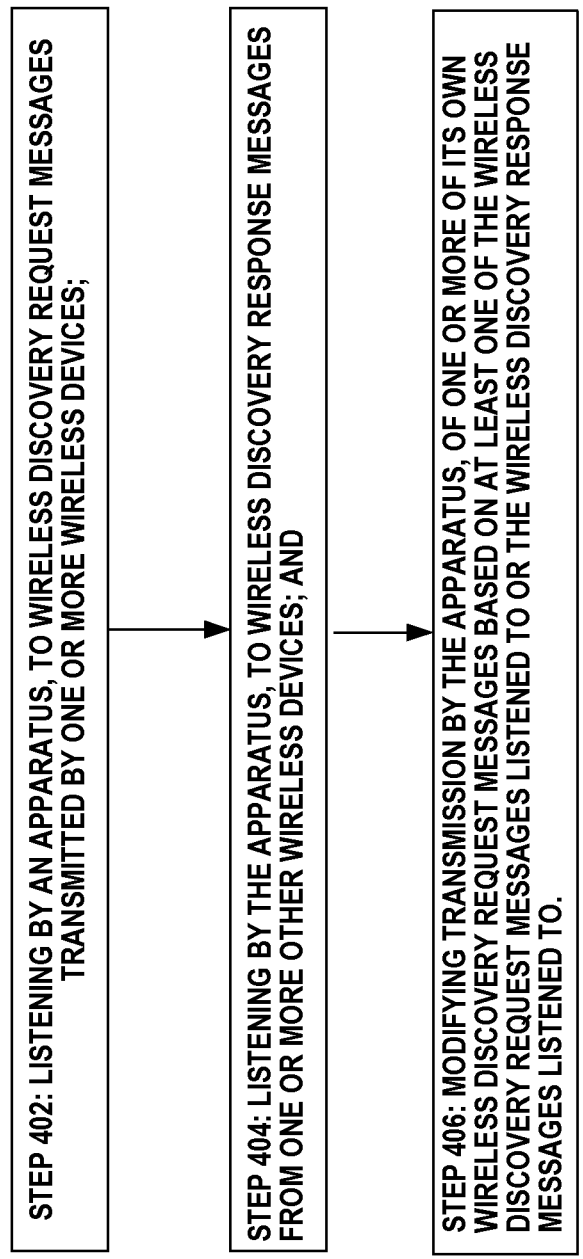
FIG. 4 illustrates an example flow diagram of operational steps of an example embodiment of the procedure performed in the listening wireless node in the discovery state, NODE C, according to an embodiment of the present invention.

FIG. 4 illustrates an example flow diagram of operational steps of an example embodiment of the procedure performed in the listening wireless node that is in the discovery state, NODE C, according to an embodiment of the present invention. FIG. 4 illustrates an example embodiment of a flow diagram 400 for the process in the listening wireless node in the discovery state, NODE C. FIG. 4 illustrates an example of steps in the procedure carried out by an apparatus, for example the wireless device, in executing-in-place program code stored in the memory of the device. The steps in the procedure of the flow diagram may be embodied as program logic stored in the memory of the wireless device in the form of sequences of programmed instructions which, when executed in the microprocessor control logic of the device, carry out the functions of an exemplary disclosed embodiment. The steps may be carried out in another order than shown and individual steps may be combined or separated into component steps. Additional steps may be inserted into this sequence. The steps in the procedure are as follows:

Step 402: listening by an apparatus, to wireless discovery request messages transmitted by one or more wireless devices;

Step 404: listening by the apparatus, to wireless discovery response messages from one or more other wireless devices; and Step 406: modifying transmission by the apparatus, of one or more of its own wireless discovery request messages based on at least one of the wireless discovery request messages listened to or the wireless discovery response messages listened to.

Example embodiments of the invention are also applicable to the Bluetooth™ basic rate/enhanced data rate (BR/EDR) communication technology. A Bluetooth™ BR/EDR device in the discovery state may transmit inquiry request packets and then it may listen for inquiry response packets from a Bluetooth™ BR/EDR responding device containing the responding device's address, clock, and class of the device. An inquiry response packet may be followed by an extended inquiry response (EIR) packet that may be used to provide additional information during the inquiry response procedure, for example a local name and a list of supported services of the Bluetooth™ BR/EDR responding device.

In accordance with example embodiments of the invention, the Bluetooth™ BR/EDR device in the discovery state may reduce the level of traffic contributed by its discovery operations. In example embodiments of the invention, a Bluetooth™ BR/EDR device in the discovery state may delay sending its own inquiry request packets and listen for inquiry response packets and an extended inquiry response (EIR) packets that may be addressed to the other requesting devices. The Bluetooth™ BR/EDR device in the discovery state may compare the discovery responses to its own discovery criteria. The Bluetooth™ BR/EDR device in the discovery state may abort sending its own inquiry request packets if any response it listens to satisfactorily compares with its own criteria or if sufficient discovery information has been gathered about the responding devices. In this manner, the Bluetooth™ BR/EDR device in the discovery state may improve its discovery performance and minimize unnecessary control frame traffic due to devices in the discovery state (i.e. discovering devices).

Example embodiments of the invention are also applicable to the Bluetooth™ Low Energy (LE) communication technology. The advertising channel of the Bluetooth™ LE protocol may be used by a device in the discovery state (i.e., the Scanning State) to send a scanning request packet, SCAN_REQ, that includes the sender's device address and the address of the intended receiving device to which this scanning request packet is addressed. The receiving device in the Advertising State may respond on the advertising channel with a scanning response packet, SCAN_RSP, that includes advertising data and the advertising responder's device address.

In accordance with example embodiments of the invention, the Bluetooth™ LE device in the discovery state may reduce the level of traffic contributed by its discovery operations. In example embodiments of the invention, a Bluetooth™ LE device in the discovery state may delay sending its own scanning request packet, SCAN_REQ, and listen for scanning response packet, SCAN_RSP, packets that may be addressed to the other requesting devices. The Bluetooth™ LE device in the discovery state may compare the discovery responses to its own discovery criteria. The Bluetooth™ LE device in the discovery state may abort sending its own scanning request packet, SCAN_REQ, packets if any response it listens to satisfactorily compares with its own criteria or if sufficient discovery information has been gathered about the responding devices. In this manner, the Bluetooth™ LE device in the discovery state may improve its discovery performance and minimize unnecessary control frame traffic due to devices in the discovery state (i.e. discovering devices).

The features described herein may also be employed in other communication technologies, such as Wireless USB (WUSB), Ultra Wide-band (UWB), ZigBee (IEEE 802.15.4, IEEE 802.15.4a), HiperLAN Type 1, HiperLAN Type 2, and ultra-high frequency radio frequency identification (UHF RFID) technologies.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable, non-transitory medium.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention. For instance, the features described herein may be employed in other networks beside the disclosed networks.

What is claimed is:

1. A method, comprising:
    listening by an apparatus to wireless communication to detect at least one of:
        wireless discovery request messages transmitted by one or more wireless mobile communication devices to detect one or more wireless local area networks, the wireless discovery request messages including information characterizing requested one or more wireless local area networks;
        wireless discovery response messages directed to one or more other wireless mobile communication devices requesting to detect associated wireless local area networks, the wireless discovery response messages including information characterizing the associated wireless local area networks; and
    modifying, by the apparatus, transmission of one or more of its own wireless discovery request messages by determining whether to transmit the one or more wireless discovery request messages based on comparison of one or more discovery criteria of the apparatus with at least one of the characterizing information of the wireless discovery request messages listened to or the characterizing information of the wireless discovery response messages listened to.

2. The method of claim 1, further comprising:
    wherein at least one of the wireless discovery responses is not addressed to the apparatus.

3. The method of claim 1, further comprising:
    wherein the wireless discovery request messages are probe requests and the wireless discovery responses are probe responses.

4. The method of claim 1, further comprising:
    wherein the wireless discovery request messages are wireless generic advertisement service requests and the wireless discovery responses are wireless generic advertisement service responses.

5. The method of claim 1, further comprising:
    wherein the apparatus is in a discovery state.

6. The method of claim 1, further comprising:
    wherein the apparatus is at least one of a wireless access point device, a mesh point device, a wireless group owner device, or a wireless station.

7. The method of claim 1, further comprising:
    wherein the one or more other devices are at least one of one or more wireless access point devices, one or more mesh point devices, one or more wireless group owner devices, or one or more wireless stations.

8. An apparatus comprising:
    at least one processor;
    at least one memory including computer program code;
    the at least one memory and the computer program code configured to, with the at least one processor, cause the apparatus at least to:
    listen to wireless communication to detect at least one of:
        wireless discovery request messages transmitted by one or more wireless mobile communication devices to detect one or more wireless local area networks, the wireless discovery request messages including information characterizing requested one or more wireless local area networks;
        to wireless discovery response messages directed to one or more other wireless mobile communication devices requesting to detect associated wireless local area networks, the wireless discovery response messages including information characterizing the associated wireless local area networks; and
    modify transmission of one or more of its own wireless discovery request messages by determining whether to transmit the one or more wireless discovery request messages based on comparison of one or more discovery criteria of the apparatus with at least one of the characterizing information of the wireless discovery request messages listened to or the characterizing information of the wireless discovery response messages listened to.

9. The apparatus of claim 8, further comprising:
    wherein at least one of the wireless discovery responses is not addressed to the apparatus.

10. The apparatus of claim 8, further comprising:
    wherein the wireless discovery request messages are probe requests and the wireless discovery responses are probe responses.

11. The apparatus of claim 8, further comprising:
    wherein the wireless discovery request messages are wireless generic advertisement service requests and the wireless discovery responses are wireless generic advertisement service responses.

12. The apparatus of claim 8, further comprising:
    wherein the apparatus is in a discovery state.

13. The apparatus of claim 8, further comprising:
    wherein the apparatus is at least one of a wireless access point device, a mesh point device, a wireless group owner device, or a wireless station.

14. The apparatus of claim 8, further comprising:
    wherein the one or more other devices are at least one of one or more wireless access point devices, one or more mesh point devices, one or more wireless group owner devices, or one or more wireless stations.

15. A computer program product comprising computer executable program code recorded on a computer readable, non-transitory storage medium, the computer executable program code, when executed by a computer processor in an apparatus, comprising:
    code for listening by an apparatus to wireless communication to detect at least one of:
        wireless discovery request messages transmitted by one or more wireless mobile communication devices to detect one or more wireless local area networks, the wireless discovery request messages including information characterizing requested one or more wireless local area networks;
        wireless discovery response messages directed to one or more other wireless mobile communication devices requesting to detect associated wireless local area networks, the wireless discovery response messages including information characterizing the associated wireless local area networks; and code for modifying, by the apparatus, transmission of one or more of its own wireless discovery request messages by determining whether to transmit the one or more wireless discovery request messages based on comparison of one or more discovery criteria of the apparatus with at least one of the characterizing information of the wireless discovery request messages listened to or the characterizing information of the wireless discovery response messages listened to.

\* \* \* \* \*